(12) United States Patent
Vitthaladevuni et al.

(10) Patent No.: US 11,863,495 B2
(45) Date of Patent: Jan. 2, 2024

(54) SIGNALING FOR A CHANNEL STATE INFORMATION REFERENCE SIGNAL (CSI-RS)

(71) Applicant: QUALCOMM Incorporated, San Diego, CA (US)

(72) Inventors: Pavan Kumar Vitthaladevuni, San Diego, CA (US); Taesang Yoo, San Diego, CA (US); Naga Bhushan, San Diego, CA (US); June Namgoong, San Diego, CA (US); Jay Kumar Sundararajan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/393,997

(22) Filed: Aug. 4, 2021

(65) Prior Publication Data
US 2022/0052827 A1 Feb. 17, 2022

Related U.S. Application Data

(60) Provisional application No. 63/065,378, filed on Aug. 13, 2020.

(51) Int. Cl.
*H04L 5/00* (2006.01)
(52) U.S. Cl.
CPC ................... *H04L 5/0057* (2013.01)
(58) Field of Classification Search
CPC .................................................. H04L 5/0057
(Continued)

(56) References Cited

U.S. PATENT DOCUMENTS

2021/0351885 A1* 11/2021 Chavva .................... G06N 3/04
2022/0158798 A1* 5/2022 Chung ................. H04L 5/0057
2022/0400434 A1* 12/2022 Seo ......................... H04L 5/001

FOREIGN PATENT DOCUMENTS

WO    WO 2014/021677    *  2/2014    ............... H04B 7/26
WO       2019228614 A1    12/2019

OTHER PUBLICATIONS

He, H., et al., "Model-Driven Deep Learning for Physical Layer Communications", Arxiv.Org, Cornell University Library, 201 Olin Library Cornell University Ithaca, NY 14853, Sep. 17, 2018 (Sep. 17, 2018), XP881019686, pp. 1-14.

(Continued)

*Primary Examiner* — Christopher R Crompton
(74) *Attorney, Agent, or Firm* — QUALCOMM Incorporated

(57) ABSTRACT

A user equipment (UE) receives, from a network entity, a message indicating a change in a set of downlink beams for channel state information reference signals (CSI-RSs), and a context associated with the change. The UE saves state values in an auto-encoder neural network in response to receiving the message and associates the saved state values in the auto-encoder neural network to the context in the received message. The UE also resets the state values in the auto-encoder neural network in response to receiving the message and estimates a channel state based on the CSI-RSs received on the changed set of downlink beams. The UE compresses the channel state with the auto-encoder neural network based on the reset state values and further sends to the network entity, the compressed channel state.

24 Claims, 9 Drawing Sheets

(58) Field of Classification Search
USPC .......................................................... 370/329
See application file for complete search history.

(56) References Cited

OTHER PUBLICATIONS

International Search Report and Written Opinion—PCT/US2021/044774—ISA/EPO—dated Nov. 16, 2021.

\* cited by examiner

SIGNALING FOR A CHANNEL STATE INFORMATION REFERENCE SIGNAL (CSI-RS)

CROSS-REFERENCE TO RELATED APPLICATION

The present application claims the benefit of U.S. Provisional Patent Application No. 63/065,378, filed on Aug. 13, 2020, and titled "SIGNALING FOR A NON-QUASI-COLOCATED (QCL'D) CHANNEL STATE INFORMATION REFERENCE SIGNAL (CSI-RS)," the disclosure of which is expressly incorporated by reference in its entirety.

FIELD OF THE DISCLOSURE

Aspects of the present disclosure generally relate to wireless communications, and more particularly to techniques and apparatuses for signaling a change in a set of downlink beams used for a channel state information reference signal (CSI-RS).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to aspects of the present disclosure, a method of wireless communication by a user equipment (UE) receives, from a network entity, a message indicating a change in a set of downlink beams for channel state information reference signals (CSI-RSs), and a context associated with the change. The method also saves state values in an auto-encoder neural network in response to receiving the message. The method associates the saved state values in the auto-encoder neural network to the context in the received message. The method resets the state values in the auto-encoder neural network in response to receiving the message. The method can continue to train the neural network and estimate a channel state based on the CSI-RSs received on the changed set of downlink beams. The method compresses the channel state with the auto-encoder neural network based on the reset state values. The method sends to the network entity, the compressed channel state.

In other aspects of the present disclosure, a method of wireless communication by a network entity changes, for a user equipment (UE), a set of downlink beams for channel state information reference signals (CSI-RSs). The network entity also transmits a message, to the UE, indicating the changing of the set of downlink beams and a context to associate with the changing. The network entity further receives, from the UE, a channel state compressed in accordance with the message.

In other aspects of the present disclosure, an apparatus for wireless communications at a user equipment (UE) includes a processor and memory coupled with the processor. Instructions stored in the memory are operable, when executed by the processor, to cause the apparatus to receive, from a network entity, a message indicating a change in a set of downlink beams for channel state information reference signals (CSI-RSs), and a context associated with the change. The apparatus can also save state values in an auto-encoder neural network in response to receiving the message. The apparatus associates the saved cell state values in the auto-encoder neural network to the context in the received message. The apparatus resets the state values in the auto-encoder neural network in response to receiving the message. The apparatus can continue to train the neural network and estimate a channel state based on the CSI-RSs received on the changed set of downlink beams. The apparatus can also compress the channel state with the auto-encoder neural network based on the reset state values. The apparatus can further send to the network entity, the compressed channel state.

In other aspects of the present disclosure, an apparatus for wireless communications at a network entity includes a processor and memory coupled with the processor. Instructions stored in the memory are operable, when executed by the processor, to cause the apparatus to change, for a user equipment (UE), a set of downlink beams for channel state information reference signals (CSI-RSs). The apparatus can also transmit a message, to the UE, indicating the changing of the set of downlink beams and a context to associate with the changing. The apparatus can further receive, from the UE, a channel state compressed in accordance with the message.

In other aspects of the present disclosure, a user equipment (UE) for wireless communications includes means for receiving, from a network entity, a message indicating a change in a set of downlink beams for channel state information reference signals (CSI-RSs), and a context associated with the change. The UE also includes means for saving state values in an auto-encoder neural network in response to receiving the message. The UE also includes means for associating the saved state values in the auto-encoder neural network to the context in the received message. The UE also includes means for resetting the state values in the auto-encoder neural network in response to receiving the message. The UE includes means for estimating a channel state based on the CSI-RSs received on the changed set of downlink beams. The UE further includes means for compressing the channel state with the auto-encoder neural network based on the reset state values. The UE includes means for sending to the network entity, the compressed channel state.

In other aspects of the present disclosure, a network entity for wireless communications includes means for changing, for a user equipment (UE), a set of downlink beams for channel state information reference signals (CSI-RSs). The network entity also includes means for transmitting a message, to the UE, indicating the changing of the set of downlink beams and a context to associate with the changing. The network entity further includes means for receiving, from the UE, a channel state compressed in accordance with the message.

In other aspects of the present disclosure, a non-transitory computer-readable medium with program code recorded thereon is disclosed. The program code is executed by a user equipment (UE) and includes program code to receive, from a network entity, a message indicating a change in a set of downlink beams for channel state information reference signals (CSI-RSs), and a context associated with the change. The UE also includes program code to save state values in an auto-encoder neural network in response to receiving the message. The UE also includes program code to associate the saved state values in the auto-encoder neural network to the context in the received message. The UE includes program code to reset the state values in the auto-encoder neural network in response to receiving the message. The UE also includes program code to estimate a channel state based on the CSI-RSs received on the changed set of downlink beams. The UE includes program code to compress the channel state with the auto-encoder neural network based on the reset state values. The UE further includes program code to send to the network entity, the compressed channel state.

In other aspects of the present disclosure, a non-transitory computer-readable medium with program code recorded thereon is disclosed. The program code is executed by a network entity and includes program code to change, for a user equipment (UE), a set of downlink beams for channel state information reference signals (CSI-RSs). The network entity also includes program code to transmit a message, to the UE, indicating the changing of the set of downlink beams and a context to associate with the changing. The network entity further includes program code to receive, from the UE, a channel state compressed in accordance with the message.

Aspects generally include a method, apparatus, system, computer program product, non-transitory computer-readable medium, user equipment, network entity, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
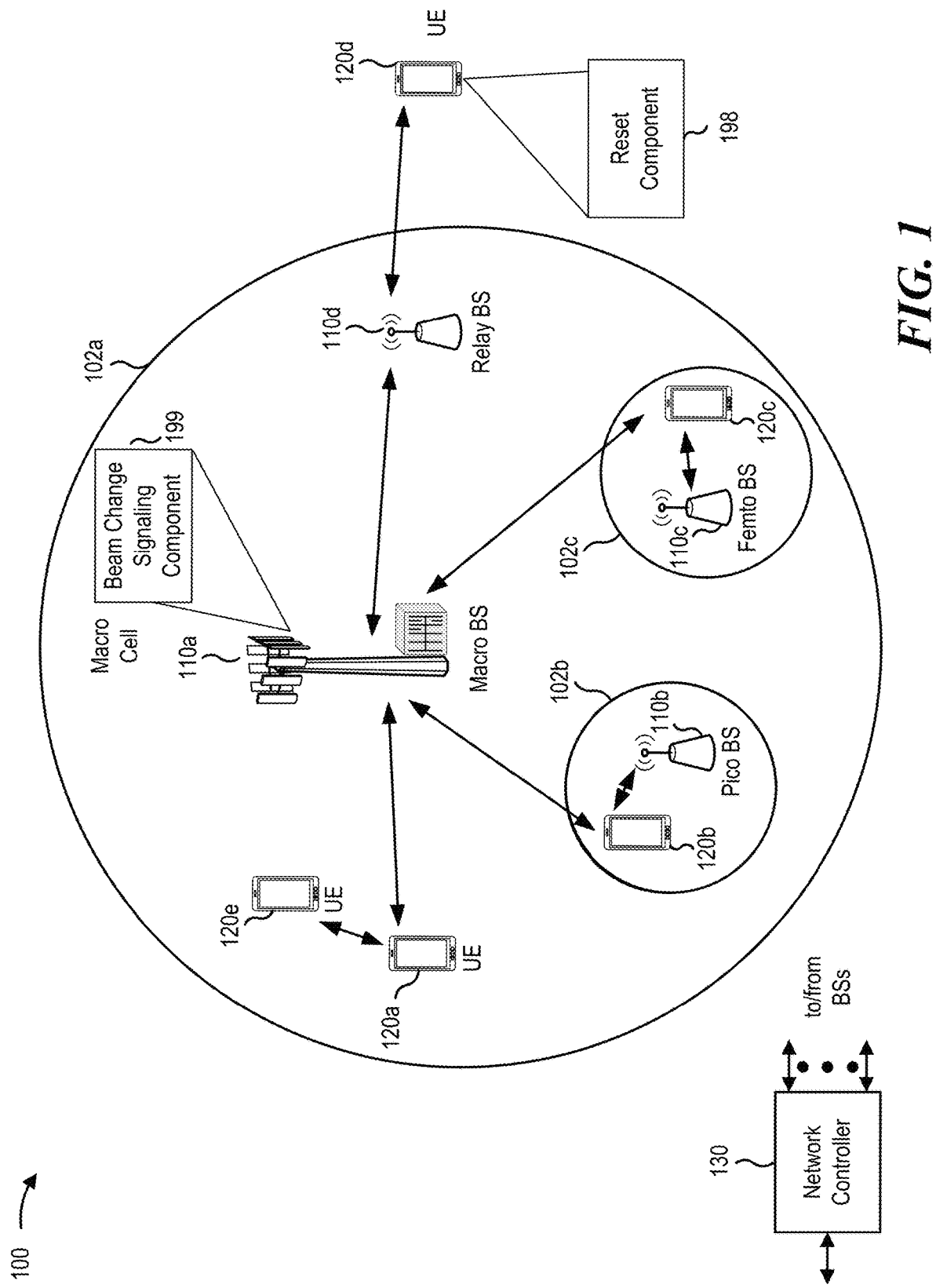
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Artificial intelligence (AI)/machine learning (ML) functions can improve wireless communications. Massive multiple-input multiple-output (MIMO) systems are an important area for 5G and later systems. To implement massive MIMO, downlink channel state information (CSI) is analyzed by a base station, having hundreds or even thousands of centralized or distributed antennas, to address inter-user interference and to increase channel capacity. The UE may perform CSI measurements based on signals, such as channel state information reference signals (CSI-RSs), received from the base station. The downlink CSI measurements are fed back from the UEs to the base station for processing. It is noted that although the term base station is used throughout this document, any network entity, such as a base station, transmission point, server or even another UE (in the case of sidelink communications) is contemplated.

The large amount of CSI feedback can be compressed with neural network processing, for example, with an auto-encoder at the UE. The UE can encode the channel state feedback and transmit the encoded feedback over the air to the base station. Upon receiving the information, the base station inputs the received encoded channel state feedback values into the decoder to approximate the channel state feedback.

In sub-6 GHz massive MIMO systems, it is common for a base station (e.g., gNB) to have a larger number of antenna ports than the number of channel state information reference signal (CSI-RS) ports configured for the UE (e.g., 256 vs. 32). In such cases, the UE only sees a snapshot of the entire channel. If the UE uses an auto-encoder for compressing (e.g., encoding) and feedback of the channel, then the auto-encoder works on this spatial snapshot. As the channel evolves in time, the time dependent machine learning blocks (e.g., recurrent neural network (RNN), long short term memory (LSTM), or gated recurring unit (GRU) blocks) in the auto-encoder capture the evolution of the complex coefficients over time. For example, with Doppler shifts, the time dependent machine learning blocks will capture the Doppler related channel variation.

If the environment changes, however, and the set of beams used for the base station (e.g., gNB) itself changes, the change of the set of beams may impact performance of the UE's auto-encoder. In such cases, according to aspects of the present disclosure, the base station may notify the UE of a change in the set of downlink beams. The notification may trigger the UE to flush the hidden states of the auto-encoder and restart the compression algorithm with a fresh slate. That is, notifying the UE that the set of downlink beams used for the CSI-RS have changed, may help the UE reset the hidden states of its auto-encoder, thereby improving the optimization framework of the channel state feedback (CSF) performance, and thus the auto-encoder's performance. The signaling can also include context information. The context information may be associated with neural network weights and hidden and/or cell state values, and may be stored by the UE in memory for future use. This enables the UE to reduce training time and/or improve training performance. A certain amount of handshake can help the UE and the base station reset the hidden and/or cell states of the encoder and decoder at the same time. Once the UE resets the hidden and/or cell states, it may send another feedback signal to the base station, indicating that the reset has been performed.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB).

In certain aspects, a UE, such as the UE 120, may include a reset component 198 configured to receive, from a network entity, a message indicating a change in a set of downlink beams for channel state information reference signals (CSI-RSs), and a context associated with the change. The reset component 198 may also be configured to save state values in an auto-encoder neural network in response to receiving the message; and to associate the saved state values in the auto-encoder neural network to the context in the received message. The reset component 198 may be configured to reset the state values in the auto-encoder neural network in response to receiving the message; and to estimate a channel state based on the CSI-RSs received on the changed set of downlink beams. The reset component 198 may also be configured to compress the channel state with the auto-encoder neural network based on the reset state values; and to send to the network entity, the compressed channel state.

A base station, such as the base station 110, may include a beam change signaling component 199 configured to change, for a user equipment (UE), a set of downlink beams for channel state information reference signals (CSI-RSs); and to transmit a message, to the UE, indicating the changing of the set of downlink beams and a context to associate with the changing. The beam change signaling component 199 may also be configured to receive, from the UE, a channel state compressed in accordance with the message.

As indicated above, FIG. 1 is provided merely as an example. Other examples may differ from what is described with regard to FIG. 1.

Figure 2:
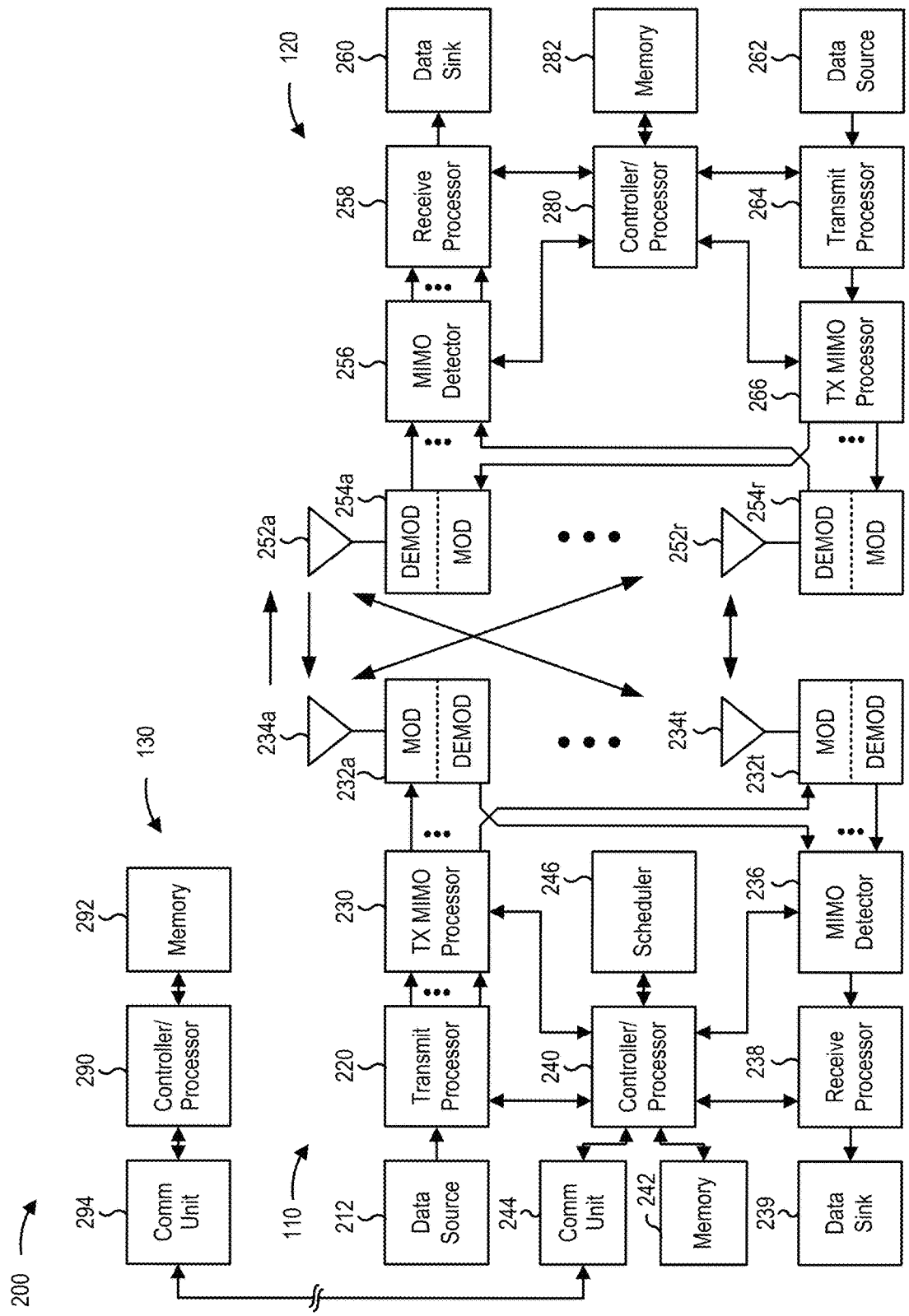
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-QCL CSI-RSs, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for saving, means for associating, means for resetting, means for estimating, means for compressing, means for sending, means for transmitting, and/or means for feeding. The base station 110 may include means for receiving, means for transmitting, and/or means for changing. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
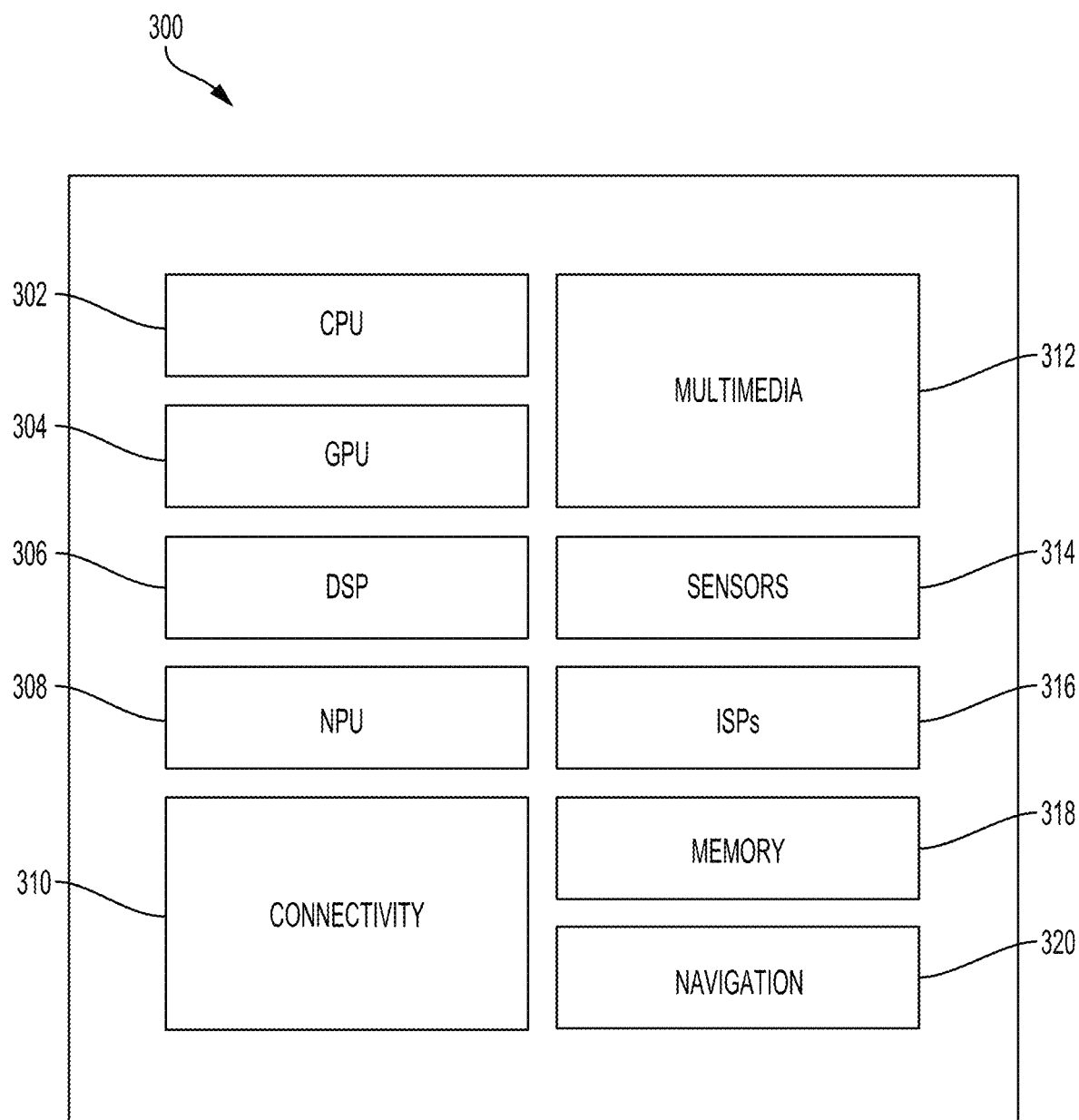
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for signaling a change of downlink transmission beams, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive, from a base station, a message indicating a change in a set of downlink beams for channel state information reference signals (CSI-RSs), and a context associated with the change; code to save state values in an auto-encoder neural network in response to receiving the message; code to associate the saved state values in the auto-encoder neural network to the context in the received message; and code to reset the state values in the auto-encoder neural network in response to receiving the message. The instructions may also comprise code to estimate a channel state based on the CSI-RSs received on the changed set of downlink beams; code to compress the channel state with the auto-encoder neural network based on the reset state values; and code to send to the base station, the compressed channel state and an indication that resetting occurred.

In other aspects of the present disclosure, the instructions loaded into the general-purpose processor 302 may comprise code to change, for a user equipment (UE), a set of downlink beams for channel state information reference signals (CSI-RSs); code to transmit a message, to the UE, indicating the changing of the set of downlink beams and a context to associate with the changing; and code to receive, from the UE, a channel state compressed in accordance with the message.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
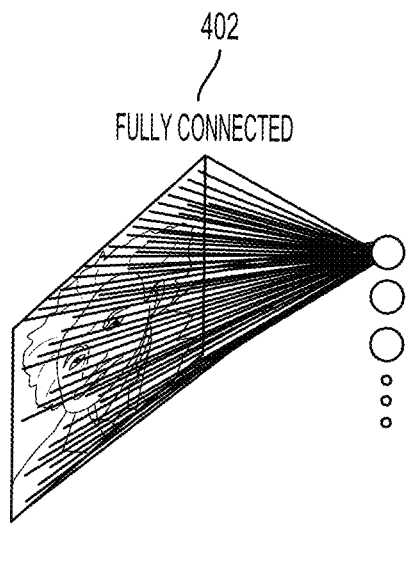
FIGS. 4A, 4B, and 4C are diagrams illustrating a neural network, in accordance with aspects of the present disclosure.
Figure 4B:
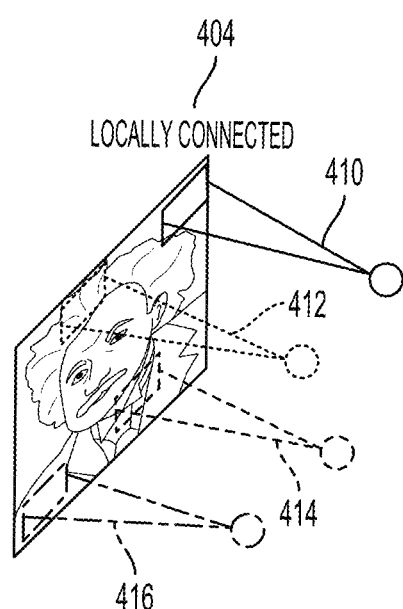

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
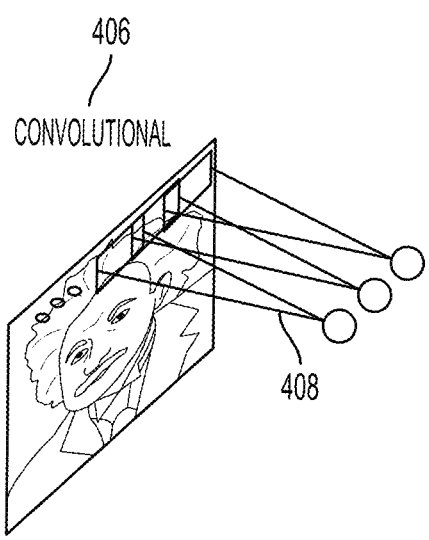

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
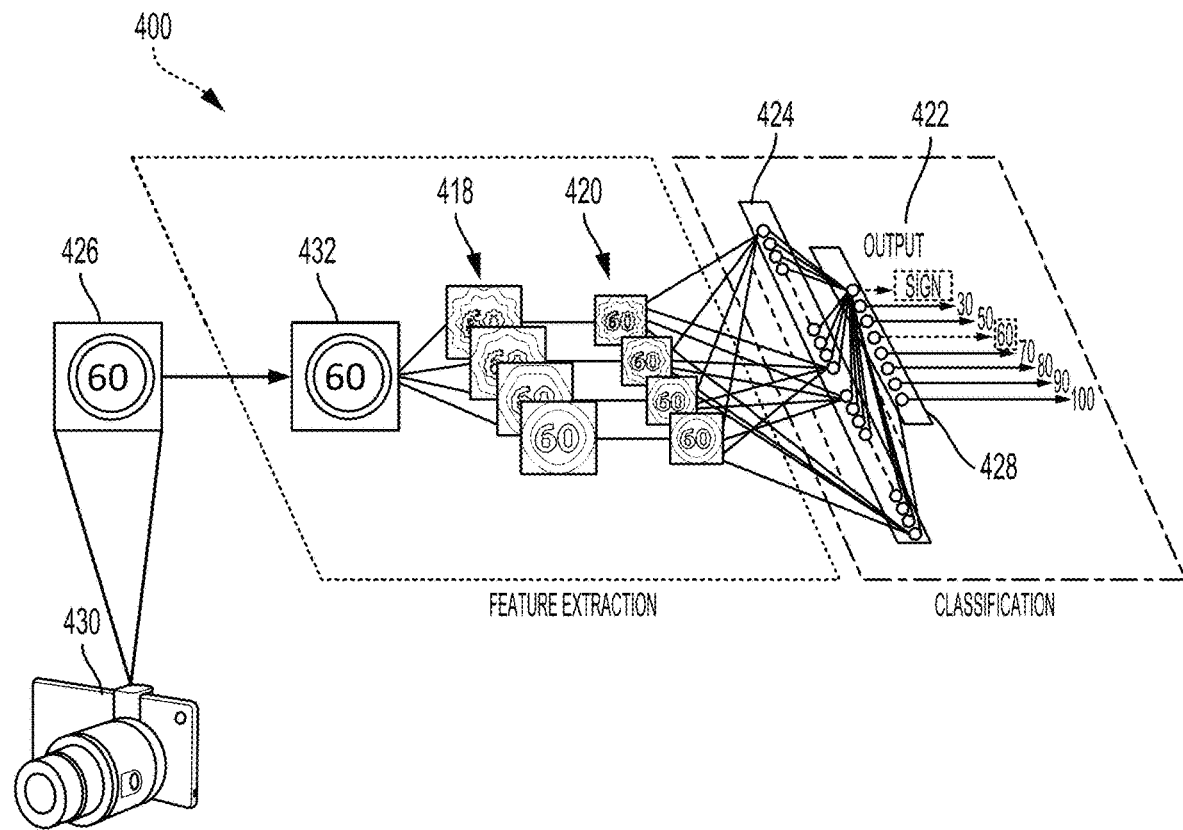
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
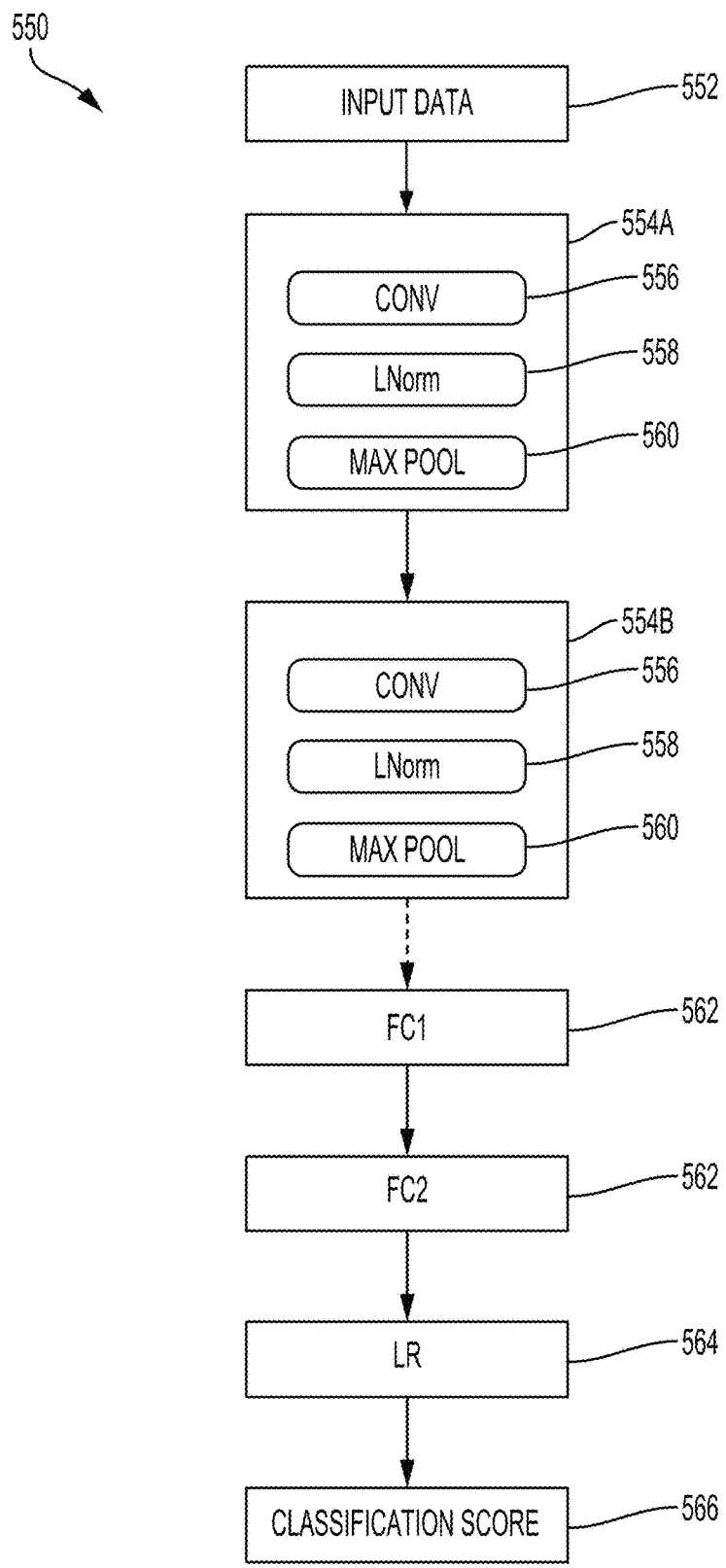
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

Artificial intelligence (AI)/machine learning (ML) algorithms can improve wireless communications. An AI/ML module can run at the UE, the base station or in the case of distributed algorithms, jointly across the UE and base station. In an auto-encoder scenario, joint training may occur across the UE and the base station.

Massive multiple-input multiple-output (MIMO) systems are an important area for 5G and later systems. To implement massive MIMO, downlink channel state information (CSI) is analyzed by a base station, having hundreds or even thousands of centralized or distributed antennas, to address inter-user interference and to increase channel capacity. The UE measures the CSI based on signals, such as channel state information reference signals (CSI-RSs), received from the base station. The downlink CSI measurements are fed back from the UEs to the base station for processing.

The large amount of CSI feedback can be compressed (e.g., encoded) with neural network processing, for example, with an auto-encoder at the UE. The UE can encode the channel state feedback and transmit the encoded feedback over the air to the base station. The channel state feedback is sent from the UE in accordance with timelines configured by radio resource control (RRC) signaling. Upon receiving the information, the base station inputs the received compressed channel state feedback values into the decoder to approximate the channel state feedback.

Figure 6:
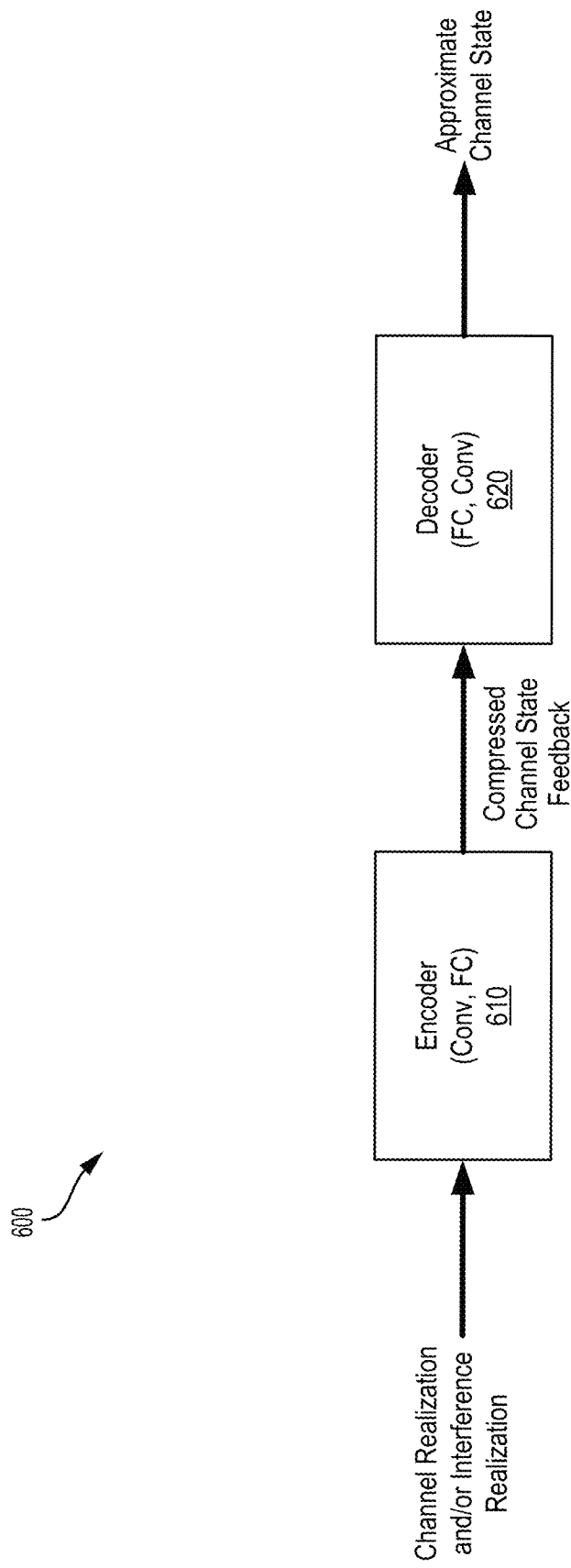
FIG. 6 is a block diagram illustrating an exemplary auto-encoder, in accordance with aspects of the present disclosure.

FIG. 6 is a block diagram illustrating an exemplary auto-encoder 600, in accordance with aspects of the present disclosure. The auto-encoder 600 includes an encoder 610 having a convolutional layer (Cony) and a fully connected layer (FC). The encoder 610 receives the channel realization and/or interference realization as an input, and compresses the channel/interference realization. The channel realization can also be referred to as a channel estimate. The interference realization can also be referred to as an interference estimate. Interference depends upon the environment and can address uplink interference or inter-stream interference in MIMO scenarios. The compressed channel state feedback is output from the encoder 610.

The auto-encoder 600 also has a decoder 620 that receives the compressed channel state feedback output from the encoder 610. The decoder 620 passes the received information through a fully connected layer and a series of convolutional layers to recover the channel state (e.g., approximate channel state).

The UE trains the encoder 610 and decoder 620, and occasionally transmits the decoder coefficients to the base station. At a higher frequency, the UE sends the outputs of the encoder 610 (e.g., channel state feedback or compressed output of the encoder 610) to the base station. As the UE moves from location to location, the weights of the decoder 620 may change. That is, when the channel environment changes, the decoder weights (e.g., coefficients) may change. Updated decoder coefficients can thus be fed back to the base station from the UE to reflect the changing environment. In other words, the UE can train the decoder 620, and not just the encoder 610, based on the existing environment. The coefficients can be sent from the UE in accordance with timelines configured by RRC signaling. In one configuration, the coefficients are sent less frequently in comparison to a frequency of the channel state feedback. Each UE sends the decoder coefficients and the encoder coefficients.

In massive multiple input multiple output (MIMO), a number of downlink antenna ports at the base station (e.g., gNB) can be greater than a number of ports on which channel state information reference signals (CSI-RSs) are sent to the UE. For example, the base station (e.g., gNB) may have 256 or 512 ports, while a UE may be sent only a 32-port CSI-RS.

In sub-6 GHz massive MIMO systems, it is common for the base station (e.g., gNB) to have a larger number of antenna ports than the number of CSI-RS ports configured for the UE (e.g., 256 vs. 32). In such cases, the UE only sees a snapshot of the entire channel. If the UE uses an auto-encoder for compressing and feedback of the channel, then the auto-encoder works on this spatial snapshot. As the channel evolves in time, the time dependent machine learning blocks (e.g., recurrent neural network (RNN), long short term memory (LSTM), or gated recurring unit (GRU) blocks) in the auto-encoder capture the evolution of the complex coefficients over time. For example, with Doppler, the time dependent machine learning blocks will capture the Doppler related channel variation.

Although the complex numbers of the machine learning coefficients evolve in time, the best downlink (DL) CSI-RS ports (e.g., DL beam indices) may not change. In a stationary channel, the fact that only a portion of the channel is observed by the UE may not make much of a difference to the UE, as the 32 ports are likely to remain unchanged.

If the environment changes, however, and the set of beams used for the base station (e.g., gNB) itself changes, the change may impact performance of the UE's auto-encoder. In such cases, according to aspects of the present disclosure, the base station may notify the UE of a change in the set of downlink beams. The notification may trigger the UE to flush its hidden states and restart the compression algorithm with a fresh slate. That is, notifying the UE that the set of downlink transmit beams used for the CSI-RS have changed, can help the UE reset the hidden states of its auto-encoder, thereby improving the optimization framework of the channel state feedback (CSF) performance, and thus the auto-encoder's performance.

In other aspects of the present disclosure, signaling from the base station indicates a context to which the UE can associate the hidden state values and/or cell state values. The context information includes information about neural network weights and hidden and/or cell states saved by the UE in memory for future use. Hidden state and/or cell values may be associated with each context. The UE may use the context information to reduce training time of the neural network or to improve training performance for a given context.

With mobility, or change of the environment around the UE, it is likely that the best CSI-RS ports (e.g., DL beams) for the UE itself may change. For example, a UE may move into a new location, making a subset of previous scatterers irrelevant. In another example, a UE's environment may change without a significant change in location, such as when reflectors change while the UE remains stationary. For example, a truck parked in front of a café, which acted as a reflector for a signal from the base station, may leave. In another example, some UEs may enter or leave the cell, thereby changing a load on the cell. Thus, a set of downlink beams used for CSI-RS may change for the current UE, especially in the case of multi-user (MU)-MIMO where orthogonalizing will result in a different set of beams for the current UE. A change in the set of DL CSI-RS beams sent to the UE may cause the current and previous sets of CSI-RSs to become non-quasi-located (non-QCL'd).

According to aspects of the present disclosure, when the CSI-RS ports change, a UE's channel compression algorithm accounts for the change. As described previously, the UE is only observing a snapshot of the channel and not the entire channel. The change in the snapshot may be captured by discarding the hidden and/or cell states in the time dependent machine learning blocks of the auto-encoder and starting the hidden states afresh. Because these hidden states are accumulated over a long period of time, resetting the hidden states improves performance of UE auto-encoders.

According to aspects of the present disclosure, whenever the set of downlink beams used by the base station (e.g., gNB) to send CSI-RSs to the UE changes, the base station sends a message, such as a reset signal and context related information, to the UE. In some aspects, the message may be a bit within a radio resource control (RRC) message or a media access control-control element (MAC-CE) message.

The UE (based on its capability to read this bit and context information) flushes the hidden state values in its auto-encoder neural networks, so as to improve the accuracy of the channel state feedback. In other aspects, the UE transmits updated auto-encoder weights in response to receiving the message, after flushing the hidden states.

The reset signal and context information help the UE flush the hidden and/or cell states, and save the previous states and weights in memory, associated to the context received. In other aspects, a handshake may occur between the UE and the base station to synchronize the states. The UE may send feedback to the base station when a hidden state and/or cell state discard has occurred. In still other aspects, synchronization is maintained by the base station sending its own hidden states to the UE.

As indicated above, FIGS. 1-6 are provided as examples. Other examples may differ from what is described with respect to FIGS. 1-6.

Figure 7:
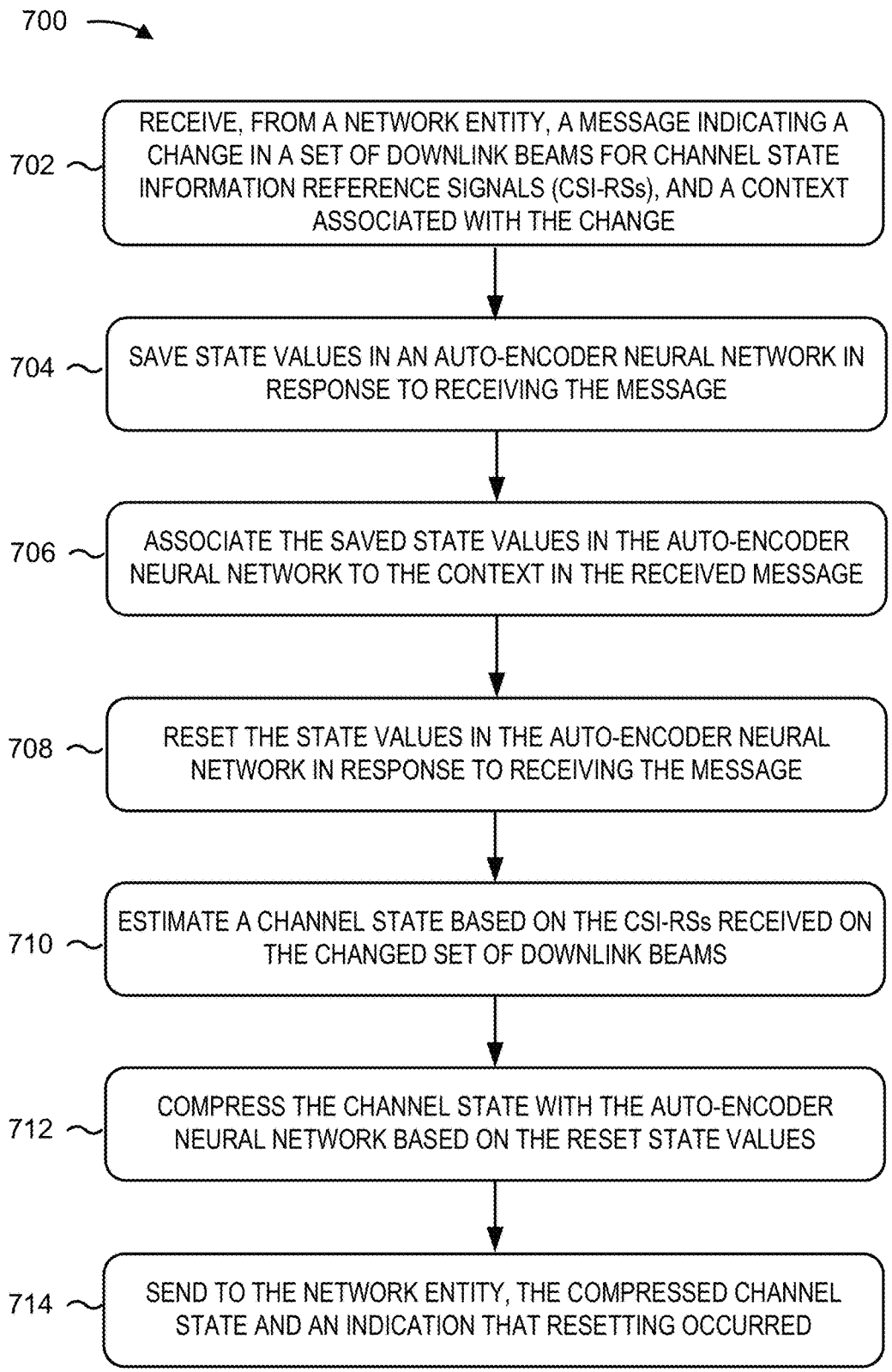
FIG. 7 is a flow diagram illustrating an example process performed, for example, by a user equipment (UE), in accordance with various aspects of the present disclosure.

FIG. 7 is a flow diagram illustrating an example process 700 performed, for example, by a UE, in accordance with various aspects of the present disclosure. The example process 700 is an example of signaling for a change in channel state information reference signal (CSI-RSs).

As shown in FIG. 7, in some aspects, the process 700 may include receiving, from a network entity, a message indicating a change in a set of downlink beams for channel state information reference signals (CSI-RSs), and a context associated with the change (block 702). For example, the user equipment (UE) (e.g., using the antenna 252, DEMOD/MOD 254, MIMO detector 256, receive processor 258, controller/processor 280, and/or memory 282) can receive the message and the context. The context may be the network environment. The changed set and a previous set of downlink beams may be non-quasi-collocated. In some aspects, the message maybe a radio resource control (RRC) message or a media access control-control element (MAC-CE) message In other aspects, the process 700 may include saving state values in an auto-encoder neural network in response to receiving the message (block 704). For example, the UE (e.g., using the controller/processor 280 and/or memory 282) can save state values. The state values in the auto-encoder neural network may be hidden and/or cell state values in a long short term memory (LSTM) network, a gated recurring unit (GRU), or a recurrent neural network (RNN)

As shown in FIG. 7, in some aspects, the process 700 may include associating the saved state values in the auto-encoder neural network to the context in the received message (block 706). For example, the UE (e.g., using the controller/processor 280 and/or memory 282) can associate the saved state values in the auto-encoder neural network.

In other aspects, the process 700 may include resetting the state values in the auto-encoder neural network in response to receiving the message (block 708). For example, the UE (e.g., using the controller/processor 280 and/or memory 282) can reset the state values. In other words, the UE may restart the compression algorithm with a fresh slate. By resetting the hidden states of its auto-encoder, the UE may improve the optimization framework of the channel state feedback (CSF) performance, and thus the auto-encoder's performance. Because these hidden states are accumulated over a long period of time, resetting the hidden states improves performance of UE auto-encoders.

As shown in FIG. 7, in some aspects, the process 700 may include estimating a channel state based on the CSI-RSs received on the changed set of downlink beams (block 710). For example, the UE (e.g., using the antenna 252, DEMOD/MOD 254, MIMO detector 256, receive processor 258, controller/processor 280, and/or memory 282) can estimate a channel state based on the CSI-RSs. For example, when the CSI-RS ports change, a UE's channel compression algorithm accounts for the change when estimating the channel state.

In still other aspects, the process 700 may include compressing the channel state with the auto-encoder neural network based on the reset state values (block 712). For example, the UE (e.g., using the controller/processor 280 and/or memory 282) can compress the channel state.

In yet other aspects, the process 700 may include sending to the network entity, the compressed channel state and optionally an indication that resetting occurred (block 714). For example, the UE (e.g., using the antenna 252, DEMOD/MOD 254, TX MIMO processor 266, transmit processor 264, controller/processor 280, and/or memory 282) can send the compressed channel state and optionally the indication.

Figure 8:
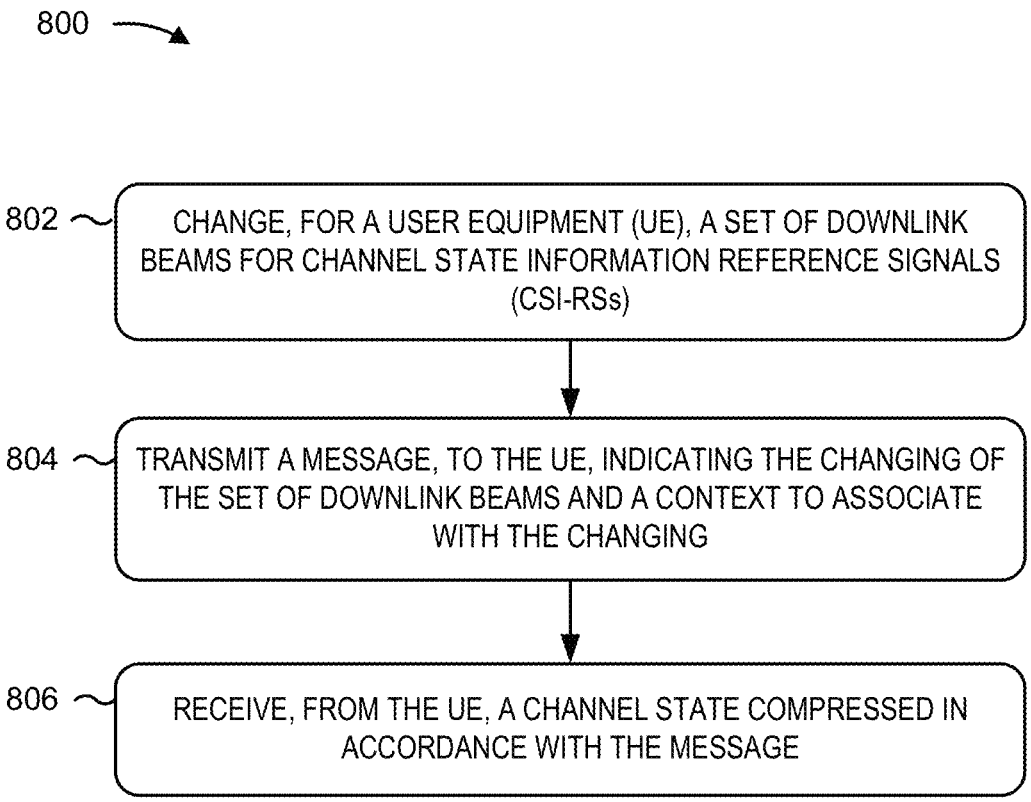
FIG. 8 is a flow diagram illustrating an example process performed, for example, by a network entity, in accordance with various aspects of the present disclosure.

FIG. 8 is a flow diagram illustrating an example process 800 performed, for example, by a network entity, in accordance with various aspects of the present disclosure. The example process 800 is an example of signaling for a change in beams for a channel state information reference signal (CSI-RS).

As shown in FIG. 8, in some aspects, the process 800 may include changing, for a user equipment (UE), a set of downlink beams for channel state information reference signals (CSI-RSs) (block 802). For example, the network entity (e.g., using the antenna 234, MOD/DEMOD 232, TX MIMO processor 230, transmit processor 220, controller/processor 240, and/or memory 242) can change the set of downlink beams. With mobility, or change of the environment around the UE, it is likely that the best CSI-RS ports (e.g., DL beams) for the UE itself may change. For example, a UE may move into a new location, making a subset of previous scatterers irrelevant. In another example, a UE's environment may change without a significant change in location, such as when reflectors change while the UE remains stationary. Thus, a set of downlink beams used for CSI-RS may change for the current UE, especially in the case of multi-user (MU)-MIMO where orthogonalizing will result in a different set of beams for the current UE.

In other aspects, the process 800 may include transmitting a message, to the UE, indicating the changing of the set of downlink beams and a context to associate with the changing (block 804). For example, the network entity (e.g., using the antenna 234, MOD/DEMOD 232, TX MIMO processor 230, transmit processor 220, controller/processor 240, and/or memory 242) can transmit the message. Whenever the set of downlink beams used by the base station (e.g., gNB) to send CSI-RSs to the UE changes, the base station sends a message, such as a reset signal and context related information, to the UE. In some aspects, the message may be a bit within a radio resource control (RRC) message or a media access control-control element (MAC-CE) message.

The process 800 may include receiving, from the UE, a channel state compressed in accordance with the message (block 806). For example, the network entity (e.g., using the antenna 234, MOD/DEMOD 232, MIMO detector 236, receive processor 238, controller/processor 240, and/or memory 242) can receive the compressed channel state. The UE (based on its capability to read this message) flushes the hidden state values in its auto-encoder neural networks so as to improve the accuracy of the channel state feedback. The channel state may be compressed in accordance with the updated auto-encoder.

Implementation examples are described in the following numbered clauses.

1. A method of wireless communication by a user equipment (UE), comprising:
    receiving, from a network entity, a message indicating a change in a set of downlink beams for channel state information reference signals (CSI-RSs), and a context associated with the change;
    saving state values in an auto-encoder neural network in response to receiving the message;
    associating the saved state values in the auto-encoder neural network to the context in the received message;
    resetting the state values in the auto-encoder neural network in response to receiving the message;
    estimating a channel state based on the CSI-RSs received on the changed set of downlink beams;
    compressing the channel state with the auto-encoder neural network based on the reset state values; and
    sending to the network entity, the compressed channel state.

2. The method of clause 1, in which the changed set of downlink beams and a previous set of downlink beams are non-quasi-collocated.

3. The method of clause 1 or 2, further comprising transmitting auto-encoder weights to the network entity in response to receiving the message.

4. The method of any of the preceding clauses, in which the state values in the auto-encoder neural network comprise hidden and/or cell state values in a long short term memory (LSTM) network, a gated recurring unit (GRU) or a recurrent neural network (RNN).

5. The method of any of the preceding clauses, in which the changed set of beams comprises a subset of network entity downlink transmit beams.

6. The method of any of the preceding clauses, in which the message comprises a radio resource control (RRC) message or a media access control-control element (MAC-CE) message.

7. The method of any of the preceding clauses, further comprising feeding back an indication that the resetting occurred.

8. The method of any of the preceding clauses, in which the message further comprises hidden and/or cell states of the network entity.

9. A method of wireless communication by a network entity, comprising:
    changing, for a user equipment (UE), a set of downlink beams for channel state information reference signals (CSI-RSs);
    transmitting a message, to the UE, indicating the changing of the set of downlink beams and a context to associate with the changing; and receiving, from the UE, a channel state compressed in accordance with the message.

10. The method of clause 9, in which current and previous sets of downlink beams are non-quasi-collocated.

11. The method of clause 9 or 10, in which the set of downlink beams comprises a subset of network entity beams.

12. The method of any of the clauses 9-11, further comprising receiving, from the UE, updated auto-encoder weights in response to transmitting the message.
13. The method of any of the clauses 9-12, further comprising receiving, from the UE, an indication that state values have been reset.
14. The method of any of the clauses 9-13, further comprising receiving, from the UE, hidden and/or cell states of the UE.
15. An apparatus for wireless communications at a user equipment (UE), comprising:
   a processor,
   memory coupled with the processor; and
   instructions stored in the memory and operable, when executed by the processor, to cause the apparatus:
      to receive, from a network entity, a message indicating a change in a set of downlink beams for channel state information reference signals (CSI-RSs), and a context associated with the change;
      to save state values in an auto-encoder neural network in response to receiving the message;
      to associate the saved state values in the auto-encoder neural network to the context in the received message;
      to reset the state values in the auto-encoder neural network in response to receiving the message;
      to estimate a channel state based on the CSI-RSs received on the changed set of downlink beams;
      to compress the channel state with the auto-encoder neural network based on the reset state values; and
      to send to the network entity, the compressed channel state.
16. The apparatus of clause 15, in which the changed set of downlink beams and a previous set of downlink beams are non-quasi-collocated.
17. The apparatus of clause 15 or 16, in which the processor causes the apparatus to transmit auto-encoder weights to the network entity in response to receiving the message.
18. The apparatus of any of the clauses 15-17, in which the state values in the auto-encoder neural network comprise hidden and/or cell state values in a long short term memory (LSTM) network, a gated recurring unit (GRU) or a recurrent neural network (RNN).
19. The apparatus of any of the clauses 15-18, in which the changed set of beams comprises a subset of network entity downlink transmit beams.
20. The apparatus of any of the clauses 15-19, in which the message comprises a radio resource control (RRC) message or a media access control-control element (MAC-CE) message.
21. The apparatus of any of the clauses 15-20, in which the processor causes the apparatus to feed back an indication that the resetting occurred.
22. The apparatus of any of the clauses 15-21, in which the message further comprises hidden and/or cell states of the network entity.
23. An apparatus for wireless communications at a network entity, comprising:
   a processor,
   memory coupled with the processor; and
   instructions stored in the memory and operable, when executed by the processor, to cause the apparatus:
      to change, for a user equipment (UE), a set of downlink beams for channel state information reference signals (CSI-RSs);
      to transmit a message, to the UE, indicating the changing of the set of downlink beams and a context to associate with the changing; and
      to receive, from the UE, a channel state compressed in accordance with the message.
24. The apparatus of clause 23, in which current and previous sets of downlink beams are non-quasi-collocated.
25. The apparatus of clause 23 or 24, in which the set of downlink beams comprises a subset of network entity beams.
26. The apparatus of any of the clauses 23-25, in which the processor causes the apparatus to receive updated auto-encoder weights in response to transmitting the message.
27. The apparatus of any of the clauses 23-26, in which the processor causes the apparatus to receive, from the UE, an indication that state values have been reset.
28. The apparatus of any of the clauses 23-27, in which the processor causes the apparatus to receive, from the UE, hidden and/or cell states of the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving, from a network entity, a message indicating a change in a set of downlink beams for channel state information reference signals (CSI-RSs), and a context associated with the change;
   saving state values in an auto-encoder neural network in response to receiving the message;
   associating the saved state values in the auto-encoder neural network to the context in the received message;
   resetting the state values in the auto-encoder neural network in response to receiving the message;
   estimating a channel state based on the CSI-RSs received on the changed set of downlink beams;
   compressing the channel state with the auto-encoder neural network based on the reset state values;
   sending to the network entity, the compressed channel state; and
   feeding back an indication that the resetting occurred.

2. The method of claim 1, in which the changed set of downlink beams and a previous set of downlink beams are non-quasi-collocated.

3. The method of claim 1, further comprising transmitting auto-encoder weights to the network entity in response to receiving the message.

4. The method of claim 1, in which the state values in the auto-encoder neural network comprise hidden and/or cell state values in a long short term memory (LSTM) network, a gated recurring unit (GRU) or a recurrent neural network (RNN).

5. The method of claim 1, in which the changed set of beams comprises a subset of network entity downlink transmit beams.

6. The method of claim 1, in which the message comprises a radio resource control (RRC) message or a media access control-control element (MAC-CE) message.

7. The method of claim 1, in which the message further comprises hidden and/or cell states of the network entity.

8. A method of wireless communication by a network entity, comprising:
   changing, for a user equipment (UE), a set of downlink beams for channel state information reference signals (CSI-RSs);
   transmitting a message, to the UE, indicating the changing of the set of downlink beams and a context to associate with the changing;
   receiving, from the UE, a channel state compressed in accordance with state values of an auto-encoder neural network that have been reset based on the message; and
   receiving, from the UE, an indication that the state values of the auto-encoder neural network have been reset.

9. The method of claim 8, in which current and previous sets of downlink beams are non-quasi-collocated.

10. The method of claim 8, in which the set of downlink beams comprises a subset of network entity beams.

11. The method of claim 8, further comprising receiving, from the UE, updated auto-encoder weights in response to transmitting the message.

12. The method of claim 8, further comprising receiving, from the UE, hidden and/or cell states of the UE.

13. An apparatus for wireless communications at a user equipment (UE), comprising:
    a processor,
    memory coupled with the processor; and
    instructions stored in the memory and operable, when executed by the processor, to cause the apparatus:
       to receive, from a network entity, a message indicating a change in a set of downlink beams for channel state information reference signals (CSI-RSs), and a context associated with the change;
       to save state values in an auto-encoder neural network in response to receiving the message;
       to associate the saved state values in the auto-encoder neural network to the context in the received message;
       to reset the state values in the auto-encoder neural network in response to receiving the message;
       to estimate a channel state based on the CSI-RSs received on the changed set of downlink beams;
       to compress the channel state with the auto-encoder neural network based on the reset state values;
       to send to the network entity, the compressed channel state; and
       to feed back an indication that the resetting occurred.

14. The apparatus of claim 13, in which the changed set of downlink beams and a previous set of downlink beams are non-quasi-collocated.

15. The apparatus of claim 13, in which the processor causes the apparatus to transmit auto-encoder weights to the network entity in response to receiving the message.

16. The apparatus of claim 13, in which the state values in the auto-encoder neural network comprise hidden and/or cell state values in a long short term memory (LSTM) network, a gated recurring unit (GRU) or a recurrent neural network (RNN).

17. The apparatus of claim 13, in which the changed set of beams comprises a subset of network entity downlink transmit beams.

18. The apparatus of claim 13, in which the message comprises a radio resource control (RRC) message or a media access control-control element (MAC-CE) message.

19. The apparatus of claim 13, in which the message further comprises hidden and/or cell states of the network entity.

20. An apparatus for wireless communications at a network entity, comprising:
    a processor,
    memory coupled with the processor; and
    instructions stored in the memory and operable, when executed by the processor, to cause the apparatus:
       to change, for a user equipment (UE), a set of downlink beams for channel state information reference signals (CSI-RSs);
       to transmit a message, to the UE, indicating the changing of the set of downlink beams and a context to associate with the changing;
       to receive, from the UE, a channel state compressed in accordance with state values of an auto-encoder neural network that have been reset based on the message; and to receive, from the UE, an indication that the state values of the auto-encoder neural network have been reset.

21. The apparatus of claim 20, in which current and previous sets of downlink beams are non-quasi-collocated.

22. The apparatus of claim 20, in which the set of downlink beams comprises a subset of network entity beams.

23. The apparatus of claim 20, in which the processor causes the apparatus to receive updated auto-encoder weights in response to transmitting the message.

24. The apparatus of claim 20, in which the processor causes the apparatus to receive, from the UE, hidden and/or cell states of the UE.

* * * * *